Inventors
Clive M. Yeomans
Erwin W. Graham
By
F. J. Schmitt
Attorney

Patented Feb. 28, 1950

2,498,674

UNITED STATES PATENT OFFICE 2,498,674

METHOD OF WINDING ELECTRICAL RESISTANCE WIRE STRAIN GAUGES

Erwin W. Graham and Clive M. Yeomans, Cleveland, Ohio

Application June 11, 1946, Serial No. 676,048

3 Claims. (Cl. 242—9)

(Granted under the act of March 3, 1883, as amended April 30, 1928; 370 O. G. 757)

This invention relates to a method for winding non-inductive electrical resistance wire strain gages. More particularly, this invention relates to a method for winding non-inductive wire strain gages in which finished gages with accurate reproducibility of strain sensitivity characteristics are obtained cheaply and with relative ease and dispatch.

The non-inductive electrical resistance wire strain gage has found wide use by engineers in the measurement of strains in assemblies which are subjected to either static or dynamic loads. When cemented or otherwise affixed to an assembly, the wire strain gage is deformed in a manner consistent with the deformation of the assembly and the resulting change in electrical resistance of the strain sensitive wire in strain gage affords a measure of the strain in the assembly.

Calibration of each wire strain gage prior to installation on an assembly would be impracticable, first, because the wire strain gage, as conventionally employed, must be cemented in place on a test bar for calibration, and would require removal prior to installation on the assembly, and, secondly, because literally hundreds of gages may be required to measure the strains in an assembly being tested. Calibration of wire strain gages therefore, is made on samples selected from a batch of gages and the reproducibility of the method of winding the gages relied upon to assure accurate reproducibility of strain sensitivity characteristics in the remainder of the batch of gages.

It is accordingly among the objects of my invention to devise a reproducible method for winding non-inductive electrical wire strain gages by means of which finished gages will be obtained which will possess accurate reproducibility of strain sensitivity characteristics.

A further object of my invention is to devise a method for winding non-inductive electrical resistance wire strain gages wherein a self spacing winding operation is employed which yields a symmetrical uniformly wound gage having non-inductive characteristics.

Figure 1:
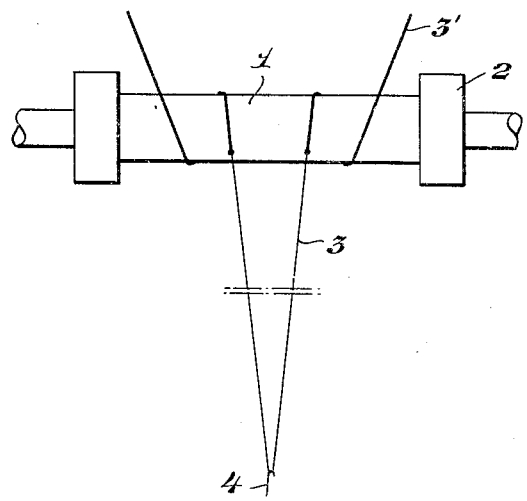
Figure 2:
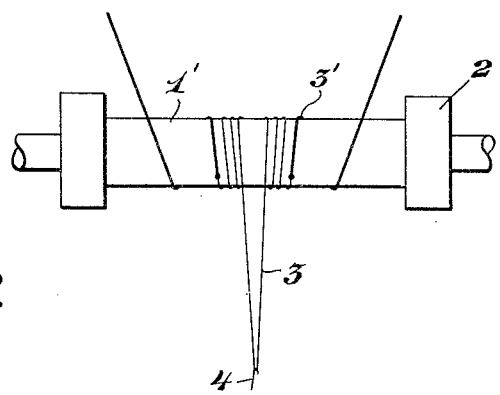
Figure 3:
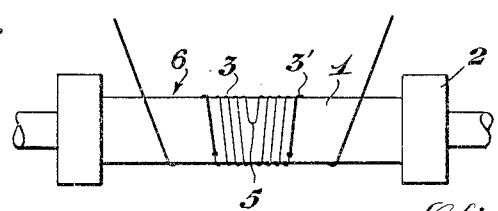

These and other objects of my invention will appear from the following description of my method and by reference to the drawings in which Fig. 1 is a schematic representation showing the relationship of the strain-gage filament to a supporting form at the start of the winding operation;

Fig. 2 is a schematic representation showing the strain-gage filament partially wound on the supporting form; and Fig. 3 is a schematic representation of the strain-gage filament completely wound on the supporting form at the completion of the winding operation.

In the practice of my invention, referring to Fig. 1, we employ a supporting form or mandrel 1 held in a device 2 which permits rotation of the form. Utilizing a prefabricated strain-gage filament consisting of a strain-sensitive wire portion 3 and leads 3' which will eventually serve as connecting leads for attaching the wire strain gage to an electrical recording circuit, we affix the leads 3' to the supporting form or mandrel in some manner similar to that shown in Figure 1. The strain sensitive wire 3 is then pulled into a symmetrical V-shape by a small hook 4 as shown, and the supporting form 2 rotated. As the wire is wound onto the form, the wire is automatically spaced on the form by virtue of the V-shape, as shown in Figure 2, to give a wire strain gage, at the completion of the winding operation, with uniform symmetrical non-inductive winding as shown in Figure 3. After the completion of the winding operation, the hook 4 is removed and the free loop 5, together with the remainder of the strain sensitive wire 3 cemented or otherwise tied into place on the form 1. When removed from the rotating device 2, the wire strain gage 6 is ready for use.

The type of strain-gage filament and supporting form, size of filament wire and form, method of rotating the form and method of fastening the filament wire to the form can be varied without departing from the spirit of my invention. My method can also be practiced by either manual or mechanical means.

By employing strain-gage filaments and supporting forms of uniform size and characteristics, my method permits the ready fabrication of strain gages having equally spaced windings, and uniform, reproducible strain-sensitivity characteristics.

The invention described herein may be manufactured and used by or for the Government of the United States of America for governmental purposes without the payment of any royalties thereon or therefor.

What is claimed is:

1. A method for winding a non-inductive resistance coil comprising the steps of affixing the ends of a resistance element in spaced relationship on a supporting form; pulling the resistance element away from the form into a V-shape whose legs pass directly to and are affixed to the supporting form; rotating the supporting form, while permitting the V-shaped resistance element to be wound onto the supporting form.

2. A method for winding a non-inductive electrical resistance wire strain gage comprising the steps of affixing the ends of a strain gage filament in spaced relationship on a supporting form; pulling the filament away from the form into a V-shape whose legs are affixed to the supporting form; rotating the form, while permitting the V-shaped filament to be wound completely onto the supporting form, and fastening the apex of the V to said form.

3. The method of claim 2 in which the strain gage filament is cemented to the supporting form at the completion of the winding operation.

ERWIN W. GRAHAM.
CLIVE M. YEOMANS.

REFERENCES CITED

The following references are of record in the file of this patent:

UNITED STATES PATENTS

| Number | Name | Date |
|---|---|---|
| 774,140 | Thomas | Nov. 1, 1904 |
| 2,243,837 | Bugler | June 3, 1941 |

FOREIGN PATENTS

| Number | Country | Date |
|---|---|---|
| 595,705 | Great Britain | Dec. 12, 1947 |